United States Patent [19]

Burton, Sr.

[11] Patent Number: 5,547,746

[45] Date of Patent: Aug. 20, 1996

[54] HIGH STRENGTH FINE SPUNBOUND FIBER AND FABRIC

[75] Inventor: Robert M. Burton, Sr., Alpharetta, Ga.

[73] Assignee: Kimberly-Clark Corporation, Neenah, Wis.

[21] Appl. No.: 156,151

[22] Filed: Nov. 22, 1993

[51] Int. Cl.⁶ .................. C08L 23/10; D02G 3/00; D04H 1/58
[52] U.S. Cl. .................. 428/288; 428/224; 428/280; 428/296; 428/365; 526/351; 525/216; 525/88; 525/95; 525/240
[58] Field of Search .................. 428/224, 288, 428/280, 296, 365; 526/351; 525/216, 88, 95, 240

[56] References Cited

U.S. PATENT DOCUMENTS

| | | | |
|---|---|---|---|
| 3,016,599 | 1/1962 | Perry | 28/78 |
| 3,207,739 | 9/1965 | Wales | 260/93.7 |
| 3,231,639 | 1/1966 | Mabru | 264/12 |
| 3,650,866 | 3/1972 | Prentice | 156/181 |
| 3,692,618 | 9/1972 | Dorschner et al. | 161/72 |
| 3,755,527 | 8/1973 | Keller et al. | 264/210 |
| 3,795,571 | 3/1974 | Prentice | 161/148 |
| 3,849,241 | 11/1974 | Butin et al. | 161/169 |
| 3,978,185 | 8/1976 | Butin et al. | 264/93 |
| 4,041,203 | 8/1977 | Brock et al. | 428/157 |
| 4,340,563 | 7/1982 | Appel et al. | 264/518 |
| 4,374,888 | 2/1983 | Bornslaeger | 428/198 |
| 4,380,570 | 4/1983 | Schwarz | 428/296 |
| 4,451,589 | 5/1984 | Morman et al. | 523/124 |
| 4,548,632 | 10/1985 | Tanaka et al. | 65/5 |
| 4,889,546 | 12/1989 | Denniston | 65/5 |
| 4,920,168 | 4/1990 | Nohr et al. | 524/188 |
| 4,981,938 | 1/1991 | Hanari et al. | 526/351 |
| 5,043,216 | 8/1991 | Misoo et al. | 428/397 |
| 5,141,910 | 8/1992 | Job | 502/127 |
| 5,146,028 | 8/1992 | Job | 585/512 |
| 5,169,706 | 12/1992 | Collier, IV et al. | 428/152 |
| 5,185,410 | 2/1993 | Job | 526/128 |
| 5,213,881 | 5/1993 | Timmons et al. | 428/224 |
| 5,266,392 | 11/1993 | Land et al. | 428/224 |
| 5,346,756 | 9/1994 | Ogale et al. | 428/288 |

FOREIGN PATENT DOCUMENTS

0552013A2  7/1993  European Pat. Off. .

*Primary Examiner*—Patrick Ryan
*Assistant Examiner*—Richard Weisberger
*Attorney, Agent, or Firm*—James B. Robinson

[57] ABSTRACT

A nonwoven fiber and fabric and process for production are provided which have comparable strength characteristics to conventional fibers and fabrics and are of a finer diameter. This is accomplished through a process of producing a nonwoven fabric made from at least one polymer which has a melt temperature between about 410° and 470° F. (210° and 243° C.), xylene solubles between about 3.5 and 7.0%, a melt flow rate between about 30 and 45, and an isotacticity of at least about 94%, extruding the polymer through fine openings, drawing the polymer to produce fibers of a denier of 1.4 or less, and then depositing the fiberized polymer on a collecting surface to form a web of disbursed fibers.

The nonwoven fabric of this invention may be used in products such as, for example, diapers, feminine hygiene products, adult incontinence products, wound dressings, bandages, sterilization wraps, surgical drapes and wipers.

10 Claims, 2 Drawing Sheets

HIGH STRENGTH FINE SPUNBOUND FIBER AND FABRIC

BACKGROUND OF THE INVENTION

This invention relates generally to a nonwoven fabric or web which is formed from fine spunbond fibers of a thermoplastic resin and the process of producing such a fabric.

Thermoplastic resins have been extruded to form fibers and webs for a number of years. The most common thermoplastics for this application are polyolefins, particularly polypropylene. Each material has its characteristic advantages and disadvantages visa vis the properties desired in the final product to be made from such fibers.

Nonwoven fabrics are useful for a wide variety of applications such as diapers, feminine hygiene products, incontinence products, towels, medical garments and many others. The nonwoven fabrics used in these applications are often in the form of laminates like spunbond/meltblown/spunbond (SMS) laminates. In SMS laminates the exterior layers are spunbond polypropylene which are usually present for strength, and the interior layer is meltblown polypropylene which is usually a barrier layer.

One of the desirable characteristics of fibers used to make the nonwoven fabrics is that they be as fine as possible. Finer fibers are desired in many applications where smoothness and uniformity are important such as, for example, in infant care products like diapers. Fine fibers are also desired since they provide better area coverage for a given amount of polymer and they allow the use of fabrics of lower basis weights. Basis weight is a measurement of area coverage and is measured in ounces per square yard (osy) or grams per square meter (gsm) of fabric. Lowering the basis weight would make products made from these fabrics lighter, thinner and, assuming equal cost per basis weight, less expensive than those made from conventional fibers.

Finer fibers, while desirable, have the drawback of generally being weaker than larger diameter fibers. This effectively sets a lower limit on the basis weight of the fabric which can be made from the fibers because of processing problems in fiberization and fabric production or because of lack of strength of the resulting fabric. The industry is constantly searching for a fiber which is very fine but which retains as much of the strength of conventional spunbond material as possible.

It is an object of this invention to provide fibers which are finer than those conventionally produced and which have comparable strength characteristics.

SUMMARY OF THE INVENTION

A nonwoven fiber and fabric are provided which have comparable strength characteristics to conventional fibers and fabrics and are of a finer diameter. This is accomplished through the provided process of producing nonwoven fabric comprising the steps of melting at least one polymer which has a melt temperature between about 410° and 470° F. (210° and 243° C.), xylene solubles between about 3.5 and 7.0%, a melt flow rate between about 30 and 45, and an isotacticity of at least about 94%, extruding the polymer through fine openings, drawing the polymer to produce fibers of a denier of 1.4 or less, and then depositing the fiberized polymer on a collecting surface to form a web of disbursed fibers. The fibers preferably have a tenacity of at least about 3 grams per denier.

The nonwoven fabric of this invention may be used in products such as, for example, diapers, feminine hygiene products, adult incontinence products, wound dressings, bandages, sterilization wraps, surgical drapes and wipers.

DEFINITIONS

As used herein the term "nonwoven fabric or web" means a web having a structure of individual fibers or threads which are interlaid, but not in a regular manner such as in knitting and weaving processes. Nonwoven fabrics or webs have been formed from many processes such as for example, meltblowing processes, spunbonding processes, and bonded carded web processes.

As used herein the term "meltblown fibers" means fibers formed by extruding a molten thermoplastic material through a plurality of fine, usually circular, die capillaries as molten threads or filaments into a high velocity gas (e.g. air) stream which attenuates the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin.

As used herein the term "spunbonded fibers" refers to small diameter fibers which are formed by extruding molten thermoplastic material as filaments from a plurality of fine openings, which are usually circular capillaries of a spinnerette, with the diameter of the extruded filaments then being rapidly reduced as by, for example, in U.S. Pat. No. 4,340,563 to Appel et al., and U.S. Pat. No. 3,692,618 to Dorschner et al.

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to isotactic, syndiotactic and random symmetries.

DETAILED DESCRIPTION

Figure 1:
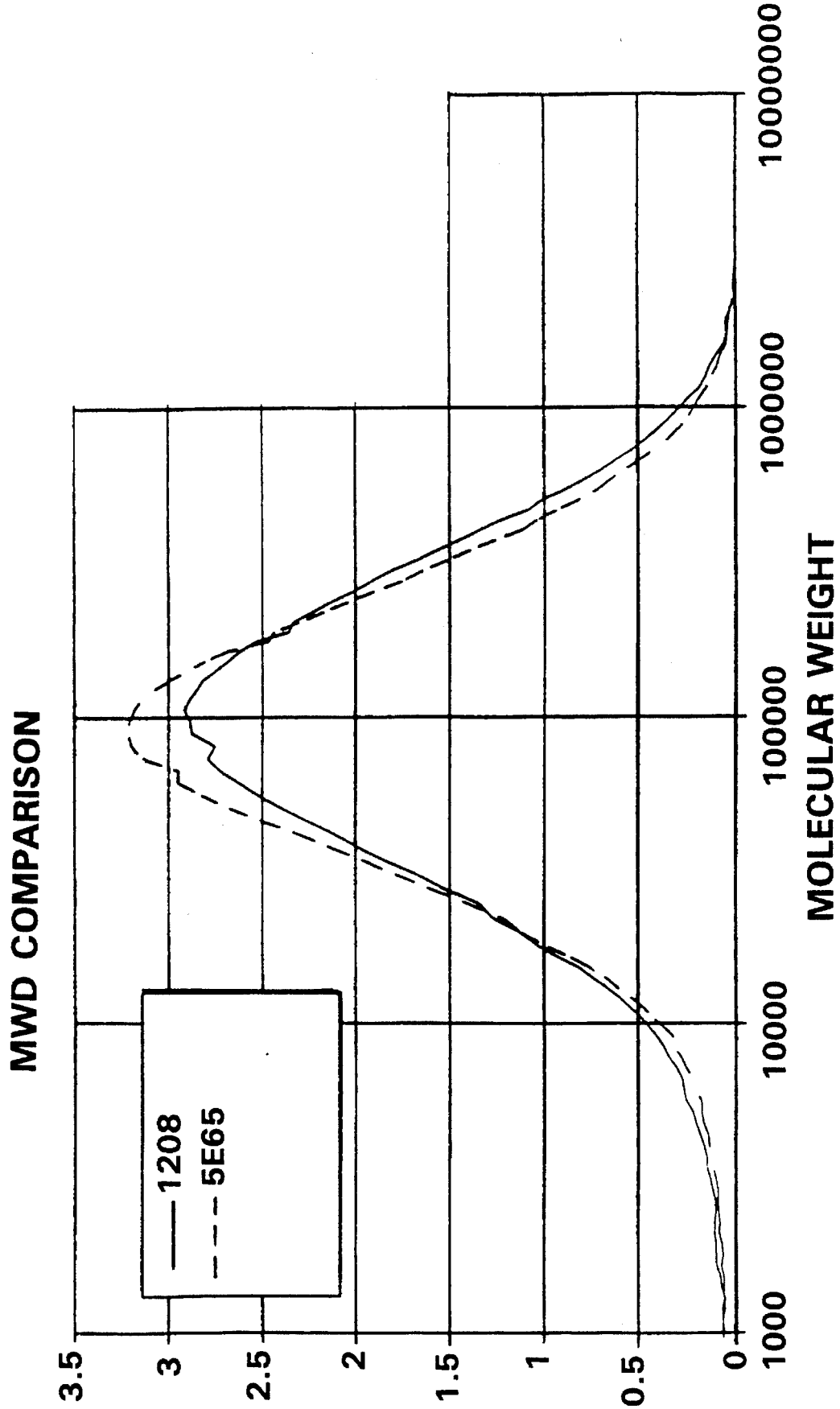
FIG. 1 is a graph of the molecular weight distribution of two polypropylenes from Shell Chemical company, 5E65 and Unipol™ 1208.

The important properties of polyolefins used in the spunbonding process are known to those skilled in the art. The melt flow rate (MFR), the molecular weight distribution (MWD) and the crystallinity are some of the most important and each of these generally measures the size of the polypropylene molecules present.

The MFR is an indication of the viscosity of the polymer with a higher number indicating a lower viscosity. The MFR is expressed as the weight of material which flows from a capillary of known dimensions under a specified load or shear rate for a measured period of time and is measured in grams/10 minutes at 230° C. according to, for example, ASTM test 1238, condition E. The molecular weight distribution gives an indication of the predominant molecular size in a given sample. A lack of indication of high molecular weight molecules is an indication of a lack of very long polypropylene molecules present in the sample.

Xylene solubles measures the amount of low molecular weight isotactic and medium molecular weight atactic species in the polymer. The xylene solubles portion of the molecular weight distribution does not crystallize and is believed to assist in the drawing process of the fiber in an aerodynamically attenuated fiber forming process.

Another measure of the crystallinity of a polymer is the percentage of isotactic polymer versus total polymer. This is referred to as the isotacticity or isotactic index and may be calculated from the nuclear magnetic resonance curve for a polymer. It has been found that polymers used in the practice of this invention must have an isotacticity of at least about 94%.

One polyolefin which may be used in the practice of this invention is a novel polypropylene available under the trade designation Unipol™ from the Shell Chemical Company, Houston, Tex. FIG. 1 shows that the Unipol™ 1208 polypropylene has a broader molecular weight distribution than, for example, the conventional 5E65 polypropylene employed in high speed fiber processes. The polymer also has a higher xylene soluble (XS) content than conventional polypropylenes. The Unipol™ 1208 polypropylene has the following physical characteristics: melt flow rate (MFR) of about 38 dg/m and xylene solubles of about 6%.

Figure 2:
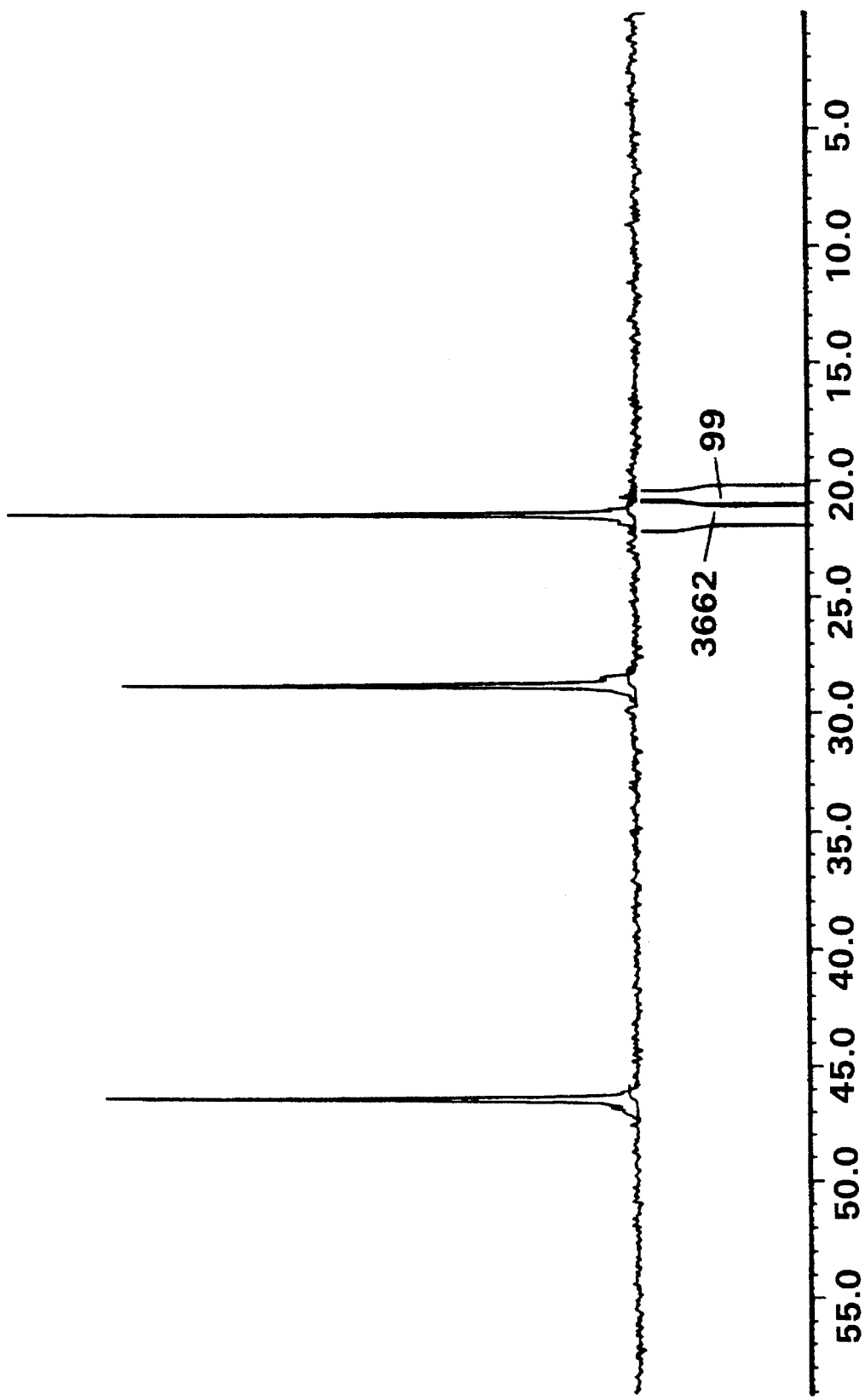
FIG. 2 is a graph of the carbon 13 Nuclear Magnetic Resonance (NMR) curve of Unipol™ 1208 polypropylene using tertiarymethylsilane as the carrier and performed in a manner known in the art on a Bruker AC-250 NMR spectrometer.

The integrated area under the atactic and isotactic peaks in the NMR curve for the Unipol™ 1208 polypropylene is given in FIG. 2 and shows the isotactic portion is 3662 at 21.4 ppm and the atactic portion is 99 at 20.8 ppm. This yields an isotacticity or isotactic index of about 97% calculated as follows: 3662/(3662+99).

The fibers from which the fabric of this invention is made are produced by the spunbonding process which is well known in the art and is described in, for example, U.S. Pat. No. 4,340,563 to Appel et al., and U.S. Pat. No. 3,692,618 to Dorschner et al., hereby incorporated by reference.

The spunbond process generally uses an extruder to supply melted polymer to a spinnerette where the polymer is fiberized as it passes through fine openings arranged in one or more rows in the spinnerette, forming a curtain of filaments. The filaments are usually quenched with air at a low pressure, drawn, usually pneumatically and deposited on a moving foraminous mat, belt or forming wire to form the nonwoven fabric. Polymers useful in the spunbond process generally have a process melt temperature of between about 406° F. to about 608° F. (208° C. to 320° C.).

The fibers produced in the spunbond process are generally in the range of from about 15 to about 50 microns in diameter, depending on process conditions and the desired end use for the fabrics to be produced from such fibers. For example, increasing the polymer molecular weight or decreasing the processing temperature result in larger diameter fibers. Changes in the quench fluid temperature and pneumatic draw pressure can also affect fiber diameter. As mentioned above, finer fibers are generally more desirable and are the object of this invention.

The fabric of this invention may be used in a single layer embodiment or as a multilayer laminate incorporating the fabric of this invention which may be formed by a number of different techniques including but not limited to using adhesive, needle punching, ultrasonic bonding, thermal calendering and any other method known in the art. Such a multilayer laminate may be an embodiment wherein some of the layers are spunbond and some meltblown such as a spunbond/meltblown/spunbond (SMS) laminate as disclosed in U.S. Pat. No. 4,041,203 to Brock et al. and U.S. Pat. No. 5,169,706 to Collier, et al. Such a laminate may be made by sequentially depositing onto a moving conveyor belt or forming wire first a spunbond fabric layer, then a meltblown fabric layer and last another spunbond layer and then bonding the laminate in a manner described above. Alternatively, the three fabric layers may be made individually, collected in rolls, and combined in a separate bonding step. The fabric of this invention may also be laminated with films, glass fibers, staple fibers, paper, and other commonly used materials. Areas in which the fabric of this invention may find utility are feminine hygiene products, adult incontinence products, wound dressings, bandages, sterilization wraps, surgical drapes and wipers. Wipers may be for industrial use or for home use as countertop or bathroom wipes.

Fine fibers have not been produced with comparable strength to that of conventional diameter polypropylene in the past. It is believed, though the inventor does not wish be bound by any particular theory, that the reason for this is that there are competing reactions occurring as the fibers are drawn. As the polymer exits the die capillary, it is believed that the polymer swells in response to the reduced pressure to which it is exposed. This phenomenon is referred to as die swell. The polymer is simultaneously exposed to the drawing force which it is believed causes stress induced crystallization to occur. Increased drawing force to reduce the fiber size at this point may result in fiber breakage or may result in an even larger fiber because of increased stress induced crystallization. It is believed that reducing the swell of the polymer as it leaves the die will reduce the overall fiber diameter and that in order to reduce the die swell the very long chain molecules in the polypropylene must be eliminated. It is believed that the polymers which satisfy the requirements for use in this invention have fewer very long chain molecules present.

The following Examples and Comparative Examples show the characteristics of fibers from polymers which satisfy the requirements of this invention versus those that do not.

EXAMPLES

Fibers were spun from Unipol™ 1208 polypropylene at a temperature of about 450°–460° F. (230°–240° C.). The Spinnerette hole size was 0.6 mm and throughput between 0.6 and 0.7 grams/hole/minute (ghm). The fibers were drawn pneumatically and the pneumatic draw force was increased in a stepwise fashion until fiber breaks occurred. The results are shown in table 1.

TABLE 1

| Example | Polymer | Microns | Break load | Tenacity |
| --- | --- | --- | --- | --- |
| 1 | 1208 | 16.3 | 4.5 | 2.7 |
| 2 | 1208 | 14.8 | 4 | 2.9 |
| 3 | 1208 | 15 | 4.2 | 2.9 |
| 4 | 1208 | 13.9 | 3.5 | 2.9 |
| 5 | 1208 | 13.5 | 4.2 | 3.7 |
| 6 | 1208 | 11.3 | 2.9 | 3.6 |
| 7 | 1208 | 12.6 | 2.8 | 2.8 |
| 8 | 1208 | 14.9 | 4.5 | 3.2 |
| 9 | 1208 | 15.4 | 4.4 | 2.9 |
| 10 | 1208 | 15.5 | 4.3 | 2.9 |

TABLE 1-continued

| Example | Polymer | Microns | Break load | Tenacity |
| --- | --- | --- | --- | --- |
| 11 | 1208 | 15.7 | 4.4 | 2.8 |
| 12 | 1208 | 15 | 4.1 | 2.9 |
| 13 | 1208 | 14.6 | 3 | 2.3 |
| 14 | 1208 | 14.6 | 4 | 3 |

Comparative Examples

Fibers were spun in a like manner as the above Examples from a comparative polypropylene from Exxon Chemical Company designated 3445 and from a comparative polypropylene from Shell Chemical designated 5E65. Exxon 3445 polypropylene has a melt flow rate of 35, xylene solubles of about 3.5 and isotacticity of 92% and was processed at a melt temperature of about 450°–460° F. Shell 5E65 polypropylene has a melt flow rate of about 36, xylene solubles of about 3.5% and isotacticity of 92% and was processed at a melt temperature of about 4500°–460° F. The results are shown in table 2.

TABLE 2

| Comparative | Polymer | Microns | Break load | Tenacity |
| --- | --- | --- | --- | --- |
| 1 | 3445 | 17.8 | 4.1 | 2 |
| 2 | 3445 | 16.7 | 5.7 | 3.3 |
| 3 | 5E65 | 19.1 | 4.8 | 2.1 |

The diameter of the fibers is given in microns which may be converted to denier by squaring, and multiplying the result by 0.00629, thus, 15 microns is equivalent to a denier of about 1.42 ($15^2 \times 0.00629 = 1.415$). The break load is given in grams and was measured by single fiber pulls using an Instron tensile tester. The tenacity is determined by dividing breaking load in grams by denier and is a measure of the strength of the fiber per cross sectional area. Tenacity is an important measurement of the suitability of a fiber for a particular use.

The results surprisingly show that fibers spun from polymers useful in this invention can have physical properties comparable to conventional polypropylene fibers of larger diameters (tenacity preferably at least about 3). Fibers as low in diameter as almost 11 microns were successfully produced using the spunbond process and had a tenacity which would be acceptable for commercial use.

I claim:

1. The nonwoven fabric produced according to the method of:

melting at least one polymer, said polymer having a melt temperature between about 410° and 470° F. (210° and 243° C.), xylene solubles between about 3.5 and 7.0%, a melt flow rate between about 30 and 45, and an isotacticity of at least about 94%;

extruding said polymer through fine openings;

drawing said polymer to produce fibers of a denier of 1.4 or less which have a tenacity of at least about 3 grams per denier, and; depositing said fiberized polymer on a collecting surface to form a web of disbursed fibers and;

which is present in a product selected from the group consisting of diapers, feminine hygiene products, adult incontinence products, and wipers.

2. The nonwoven fabric produced according to the method of claim 1 further comprising a layer of meltblown material deposited onto said polymer.

3. The nonwoven fabric produced according to the method of claim 2 further comprising a layer of spunbond material deposited onto said meltblown material.

4. The nonwoven fabric produced according to the method of claim 1 wherein said polymer has the NMR curve of FIG. 2.

5. A nonwoven fabric comprising fine fibers of less than 1.4 denier produced from a polymer having a melt temperature between about 410° and 470° F. (210° and 243° C.), xylene solubles between about 3.5 and 7.0%, a melt flow rate between about 30 and 45, and an isotacticity of at least about 94%.

6. The nonwoven fabric of claim 5 wherein said fibers have a tenacity of at least about 3 grams per denier.

7. The nonwoven fabric of claim 5 which is made by the spunbond process.

8. The nonwoven fabric of claim 5 wherein said polymer has the NMR curve of FIG. 2.

9. The nonwoven fabric of claim 5 which is laminated to a material selected from the group consisting of films, glass fibers, staple fibers, and papers.

10. The nonwoven fabric of claim 1 wherein said polymer is a polypropylene.

* * * * *

UNITED STATES PATENT AND TRADEMARK OFFICE
CERTIFICATE OF CORRECTION

PATENT NO.    : 5,547,746
DATED         : August 20, 1996
INVENTOR(S)   : Robert M. Burton, Sr.

It is certified that error appears in the above-identified patent and that said Letters Patent is hereby corrected as shown below:

<u>Title page</u>,
Item [57], ABSTRACT,
Line 12, delete "disbursed" and insert -- dispersed -- therefor.

<u>Column 1</u>,
Line 66, delete "disbursed" and insert -- dispersed -- therefor.

<u>Column 2</u>,
Line 33, delete "disbursed" and insert -- dispersed -- therefor.

<u>Column 6</u>,
Line 15, delete "disbursed" and insert -- dispersed -- therefor.

Signed and Sealed this

Twenty-second Day of June, 2004

JON W. DUDAS
*Acting Director of the United States Patent and Trademark Office*